(12) United States Patent
Price

(10) Patent No.: US 8,883,279 B2
(45) Date of Patent: Nov. 11, 2014

(54) FLUID-ASSISTED INJECTION MOLDED ARTICLES AND PROCESS

(75) Inventor: Kenneth Leon Price, Florence, KY (US)

(73) Assignee: Ticona LLC, Florence, KY (US)

( * ) Notice: Subject to any disclaimer, the term of this patent is extended or adjusted under 35 U.S.C. 154(b) by 445 days.

(21) Appl. No.: 12/894,899

(22) Filed: Sep. 30, 2010

(65) Prior Publication Data

US 2012/0082811 A1   Apr. 5, 2012

(51) Int. Cl.

| | | |
|---|---|---|
| *B29D 22/00* | (2006.01) | |
| *B29D 23/00* | (2006.01) | |
| *B32B 1/08* | (2006.01) | |
| *B29C 45/17* | (2006.01) | |
| *C08L 67/02* | (2006.01) | |
| *B29C 45/00* | (2006.01) | |
| *B29K 67/00* | (2006.01) | |

(52) U.S. Cl.
CPC ............. *C08L 67/02* (2013.01); *B29C 45/1704* (2013.01); *B29C 45/0013* (2013.01); *B29C 45/0005* (2013.01); *B29K 2067/003* (2013.01)
USPC .......................... 428/35.7; 428/34.1; 428/36.9

(58) Field of Classification Search
USPC ................. 428/35.7, 402, 36.9; 525/174, 173
See application file for complete search history.

(56) References Cited

U.S. PATENT DOCUMENTS

| | | |
|---|---|---|
| 3,953,394 A | 4/1976 | Fox et al. |
| 4,122,061 A | 10/1978 | Holub et al. |
| 4,140,669 A | 2/1979 | Phipps, Jr. et al. |
| 4,337,192 A | 6/1982 | Campbell |
| 4,401,792 A | 8/1983 | Axelrod et al. |
| 4,421,888 A | 12/1983 | Okada |
| 4,444,931 A | 4/1984 | Lu et al. |
| 4,778,842 A | 10/1988 | Taniguchi et al. |
| 4,874,809 A | 10/1989 | Keep |
| 4,915,885 A | 4/1990 | Avramova et al. |
| 5,049,056 A | 9/1991 | Baxi et al. |
| 5,115,016 A | 5/1992 | Dickens et al. |
| 5,149,734 A | 9/1992 | Fisher et al. |
| 5,354,523 A | 10/1994 | Shah |
| 5,589,530 A | 12/1996 | Walsh |

(Continued)

FOREIGN PATENT DOCUMENTS

| | | |
|---|---|---|
| EP | 0612807 A2 | 8/1994 |
| EP | 1449871 A2 | 8/2004 |

(Continued)

OTHER PUBLICATIONS

International Search Report and Written Opinion, PCT/US2008/074994, mailed Jun. 2, 2009.

(Continued)

*Primary Examiner* — Ellen S Raudenbush
(74) *Attorney, Agent, or Firm* — Dority & Manning, P.A.

(57) ABSTRACT

Fluid-assisted injection molding articles and processes for producing the articles are described. In one embodiment, a fluid-assisted injection molded article is formed from a polymeric composition containing a polyethylene terephthalate homopolymer in combination with a polyethylene terephthalate copolymer. The polyethylene terephthalate copolymer may comprise a copolymer of polyethylene terephthalate with isophthalic acid. The polymeric composition can also contain a reinforcing agent, such as glass fibers. Products made in accordance with the present disclosure have shown dramatically improved surface characteristics. In particular, pitting on the surface of the molded article is minimized.

14 Claims, 5 Drawing Sheets

(56) References Cited

U.S. PATENT DOCUMENTS

| | | |
|---|---|---|
| 6,300,399 B1 | 10/2001 | Gallucci et al. |
| 6,579,489 B1 | 6/2003 | Thomas |
| 6,896,844 B2 | 5/2005 | Thomas |
| 7,282,170 B2 * | 10/2007 | Dutmer et al. ............ 264/328.18 |
| 7,297,755 B2 | 11/2007 | Shelby et al. |
| 7,683,112 B2 * | 3/2010 | Kimura et al. ................. 524/117 |
| 2004/0167277 A1 | 8/2004 | Chang et al. |
| 2008/0161468 A1 | 7/2008 | Juikar et al. |

FOREIGN PATENT DOCUMENTS

| | | |
|---|---|---|
| EP | 1645394 A2 | 4/2006 |
| JP | 11049937 A | 2/1999 |
| WO | WO 90/00466 | 1/1990 |
| WO | WO 2007/089517 A1 | 8/2007 |
| WO | WO 2008/033767 A1 | 3/2008 |
| WO | WO2010027351 * | 9/2008 |

OTHER PUBLICATIONS

Gas-Assisted Injection Molding of High Gloss Large Parts, Miguel Cruz and Adalberto Trejo, not dated.

Water-Assist Injection Molding (WAIM), http://www.ides.com/articles/, at least as early as Sep. 26, 2007.

Polyethylene Terephthalate, http://en.wikipedia.org, at least as early as Jan. 28, 2008.

Injection Molding Gas Assist Technology Guide, GE Plastics, not dated.

\* cited by examiner

FLUID-ASSISTED INJECTION MOLDED ARTICLES AND PROCESS

BACKGROUND

Semi-crystalline polymers are useful as engineering thermoplastics because they possess advantageous chemical, physical and electrical properties. Semi-crystalline thermoplastic polymers, for instance, can be readily processed by thermal means and formed into numerous and different shapes. For instance, thermoplastic polymers can be formed into various articles through one of many different molding processes such as extrusion, rotational molding, blow molding, and injection molding.

One particular type of injection molding that is used to produce plastic articles is typically referred to in the art as fluid-assisted injection molding. In fluid-assisted injection molding, a molten polymer composition is injected into a mold in conjunction with a fluid, such as a gas. The fluid is injected into the mold under pressure placing a force on the molten polymer composition. In this manner, the fluid not only forces the polymeric composition into the extremities of the mold, but also creates an internal hollow cavity or void space in the resulting article. During the process, a single fluid can be introduced into the mold or multiple fluids. For instance, in one particular embodiment, a gas is injected into the mold followed by a liquid.

The fluid maintains pressure against the polymeric composition until the polymeric composition substantially cools. Once the article is cooled, the fluid pressure is reduced and the article is removed from the mold.

During fluid-assisted injection molding, the fluid provides numerous benefits. For instance, by forming a hollow cavity or void on the interior of the article, less plastic is used to produce the article and the resulting article is lighter. The fluid can also be used to speed up the cycle time or the time it takes to produce the article. As described above, the fluid also forces the polymer composition into the different parts of the mold and potentially improves the surface characteristics of the resulting article.

The present disclosure is directed to further improvements in fluid-assisted injection molding processes. In particular, in the past, although fluid-assisted injection molding can produce products having relatively favorable surface characteristics, pitting on the surface still remains a problem, especially when producing fiber reinforced articles. The present disclosure is directed particularly to the production of fluid-assisted injection molding articles that have reduced surface imperfections, such as pits or glass fiber on the surface.

SUMMARY

The present disclosure is directed to improved fluid-assisted injection molded articles and to corresponding processes for producing the articles. More particularly, the present disclosure is directed to a fluid-assist injection molded article having low surface imperfections by way of a combination of increased gloss and low incidence of surface pits. The fluid-assist molded article is molded from a composition comprising a polymer mixture and from about 5% to about 50%, such as from about 10% to about 25%, such as from about 10% to about 20% by weight of a filler selected from a platelet filler (i) having an aspect ratio of from 3 to 25, and fibrous fillers (ii) having a diameter of from 7 to 21 μm and length up to 5 mm, and combinations of (i) and (ii) thereof, the filler properties being characterized prior to incorporation into the composition. In accordance with the present disclosure, the polymer mixture combined with the filler contains a polyethylene terephthalate homopolymer combined with a polyethylene terephthalate copolymer. The polyethylene terephthalate copolymer may comprise, for instance, a copolymer of polyethylene terephthalate with isophthalic acid. The polyethylene terephthalate homopolymer and the polyethylene terephthalate copolymer may be present in the polymer mixture at a weight ratio of from about 10:90 to about 70:30, such as from about 15:85 to about 65:35.

The polymer mixture may be present in the composition in an amount from about 45% to about 95% by weight. For instance, the polymer mixture may be present in the composition in an amount greater than about 50% by weight, such as greater than about 60% by weight, such as greater than about 75% by weight. The polymer mixture may be present in the composition in an amount less than about 90% by weight, such as in an amount less than about 85% by weight.

In addition to a polyethylene terephthalate homopolymer and a polyethylene terephthalate copolymer, the polymer mixture may optionally contain another polyester. The other polyester may comprise, for instance, a polybutylene terephthalate, a polybutylene napthalate, a polytrimethylene terephthalate, a polypropylene terephthalate or a polycyclohexylene dimethyl terephthalate. In one embodiment, for instance, the polymer mixture may contain polybutylene terephthalate in an amount from about 2% to about 15% by weight. The polybutylene terephthalate, for instance, may serve as a carrier for a pigment, such as a black pigment. The black pigment may comprise, for instance, carbon black and/or a black dye.

The filled polyester compositions defined herein being processed under fluid-assist injection conditions to result in hollow molded articles showing significant and unexpected improvement in surface quality, as measured by instrumented gloss readings and reduced surface imperfections as evaluated by ImagePro® digitized micrograph analysis of the exterior molded surface of the formed article which is shaped by the interior mold cavity. Of particular advantage, the invention further provides a balance to minimize sacrifices in melt flow rate, and the rate of crystallization while providing improved surface quality. In one embodiment, for instance, the exterior surface of an article made in accordance with the present disclosure may contain pits in an amount less than about 2.5% of the surface area of the exterior surface, such as in an amount of less than about 1.7% of the surface area of the exterior surface, such as even in an amount less than about 1% of the surface area of the exterior surface.

A full and enabling disclosure of the present invention, including the best mode thereof to one skilled in the art, is set forth more particularly in the remainder of the specification, including reference to the accompanying figures, in which:

DETAILED DESCRIPTION

Figure 1:
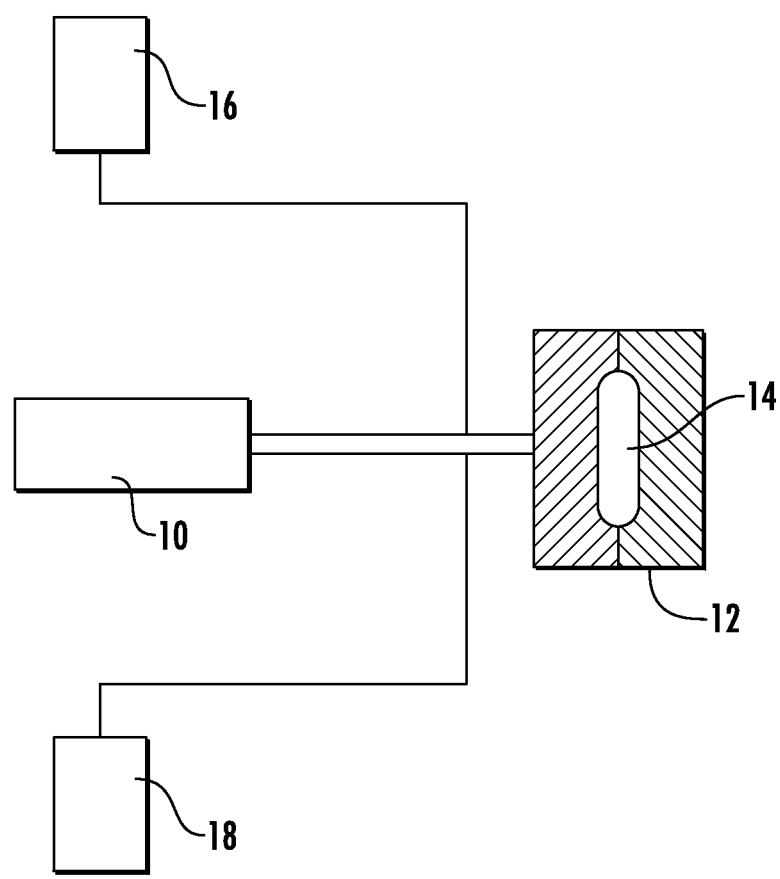
FIG. 1 is one embodiment of a schematic diagram of a fluid-assisted injection molding process that may be used in accordance with the present disclosure.
Figure 2:
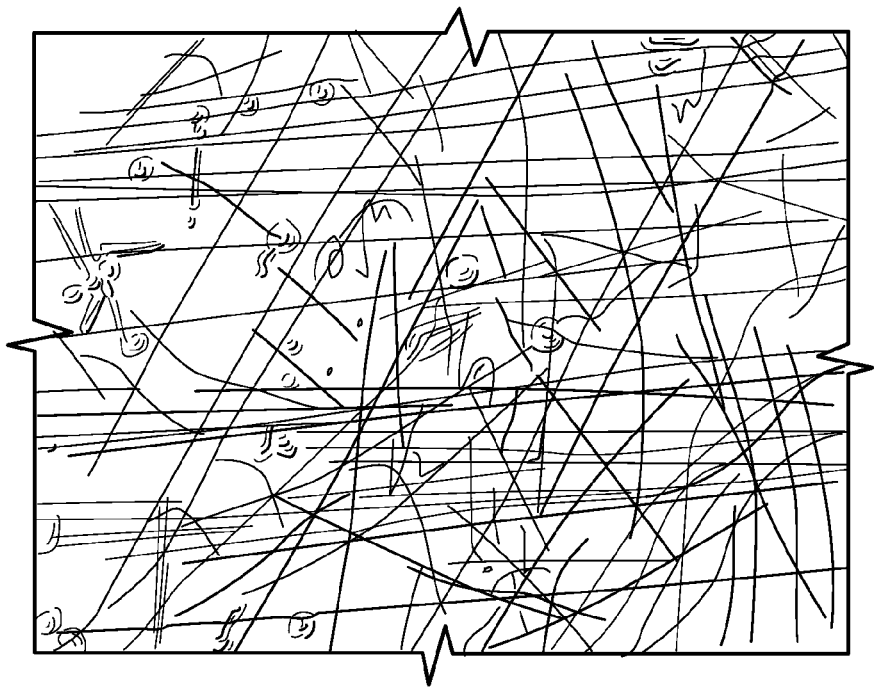
FIGS. 2 to 5 are micrographs illustrating the surface of samples made according to the Examples below.
Figure 3:
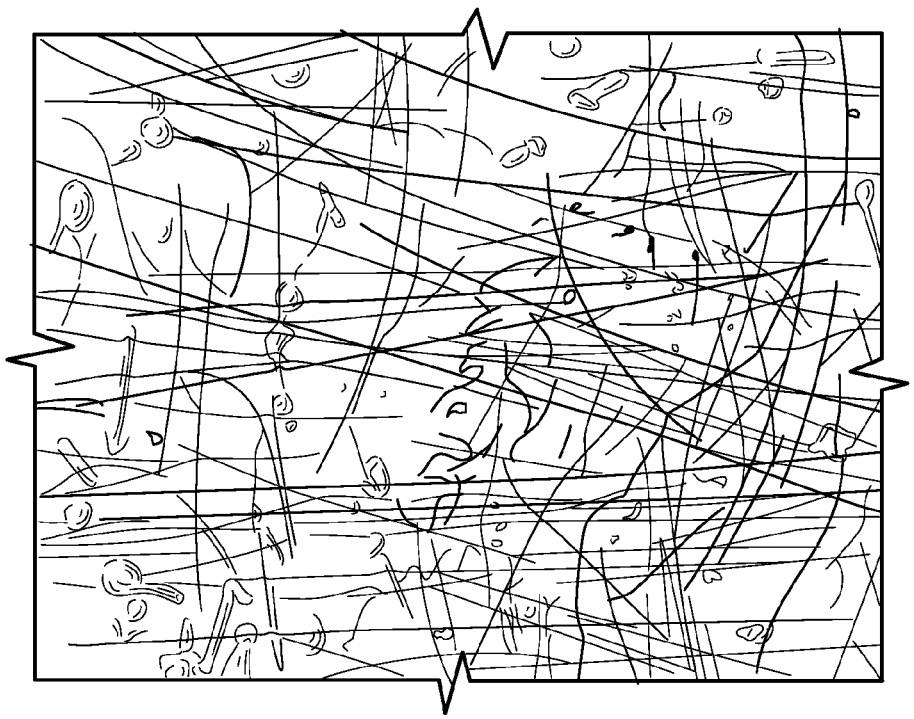
Figure 4:
Figure 5:
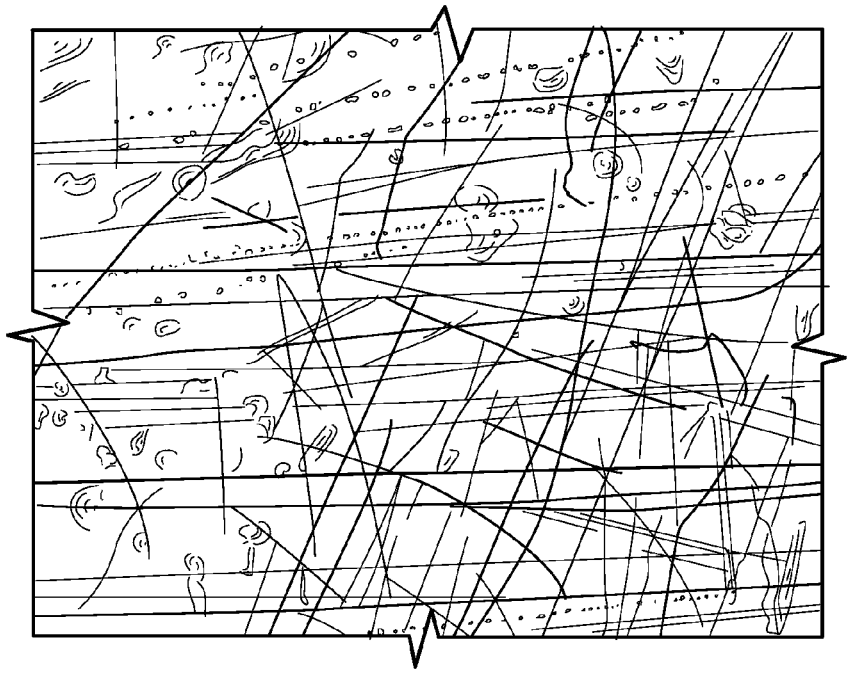

It is to be understood by one of ordinary skill in the art that the present discussion is a description of exemplary embodiments only, and is not intended as limiting the broader aspects of the present invention.

In general, the present disclosure is directed to filled polyester compounds processed via the fluid-assisted injection molding process to make superior shaped articles. The articles in accordance with the invention exhibit dramatically improved surface characteristics compared to polyester polymer compositions used in the past.

In one embodiment of the present disclosure, for instance, a fluid-assisted injection molded article is formed from a filled polymeric composition containing a polymer mixture of a polyethylene terephthalate homopolymer combined with a polyethylene terephthalate copolymer. The polyethylene terephthalate copolymer, for instance, may comprise a polyethylene terephthalate copolymerized with a diacid. In one embodiment, for instance, the copolymer may comprise a copolymer of polyethylene terephthalate with isophthalic acid. The isophthalic acid may be present in the copolymer in an amount from about 0.5 mol % to about 10 mol % of the diacids, such as from about 0.5 mol % to about 5 mol % of the diacids. The polyethylene terephthalate homopolymer and the polyethylene terephthalate copolymer may be present in the polymer mixture in a weight ratio of from about 10:90 to about 70:30, such as in a weight ratio of from about 15:85 to about 65:35.

The polymer mixture may be contained within the polymeric composition in an amount from about 45% by weight to about 95% by weight. For instance, the polymer mixture may be contained in the composition in an amount greater than about 50% by weight, such as in an amount greater than about 60% by weight, such as in an amount greater than about 70% by weight. The polymer mixture may also be contained in the composition in an amount less than about 90% by weight, such as in an amount less than about 85% by weight.

In addition to the polyethylene terephthalate homopolymer and the polyethylene terephthalate copolymer, the polymer mixture may optionally contain another polymer, such as a polyester polymer. For instance, the polymer mixture may also contain a polybutylene terephthalate, a polybutylene naphthalate, a polytrimethylene terephthalate, a polypropylene terephthalate or a polycyclohexylene dimethyl terephthalate. In one embodiment, for instance, the polymer mixture may contain a polybutylene terephthalate in an amount from about 2% to about 15% by weight. In one embodiment, the other polyester may be present in the polymer mixture as a carrier for one or more pigments.

The polyethylene terephthalate copolymer suitable for use in the polymer mixture is one which exhibits a comparatively slower crystallization time versus a PET homopolymer, in the compounded formulation. For example, in one compound where PET homopolymer is present at 98.5% of the total polyester polymers present, the crystallization time at 220° C. is about 0.32 min. In another compound where a polyester copolymer in accordance with the present disclosure is present at 98.5% of the total polyester polymers present, the crystallization time at 220° C. can be about 2.35 mins or longer.

The crystallization time can be important in delaying the onset of polymer skin formation during the fluid injection stage after the molten compound has been introduced by the short-shot method. Thus, in one embodiment, a polymer mixture can be formulated in accordance with the present disclosure by varying the relative amounts of the polyester polymers such that the polymer mixture has a crystallization time that may be desired for a particular application within the range described above. For instance, the crystallization time of the polymer mixture can be greater than about 015 mins, such as greater than about 0.8 mins, such as greater than about 0.9 mins, such as greater than about 1 min. In one embodiment, the crystallization time can be greater than about 1.5 mins, such as greater than about 2 mins. In most applications, the crystallization time is less than about 3 mins. The crystallization time is an indication of the crystallization rate and is measure using a Differential Scanning Calorimeter (DSC) by raising the material above its melt point and then reducing the temperature to a set point and holding it constant. The time between the onset of crystallization and the peak of crystallization is the crystallization time. The longer the crystallization time, the slower the material crystallizes.

By having a properly controlled crystallization time, cycle times for compositions made in accordance with the present disclosure can be significantly reduced when processing the compositions according to a gas-assist injection molding process. Cycle times, for instance, can be reduced by greater than 5%, such as greater than 10%, such as greater than 15%, such as even greater than 20% in comparison to cycle times under the same conditions using only a PET homopolymer. For instance, under exactly the same conditions and containing exactly the same additives, a composition made according to the present disclosure can have a cycle time that is from about 3% to about 10% shorter, such as from about 5% to about 8% shorter than a cycle time for an identical composition only containing a PET homopolymer and not containing a PET copolymer.

In one embodiment, the polyester copolymer comprises, but is not limited to the following diacids: terephthalic acid, isophthalic acid, 2,6-napthalenedicarboxylic acid, phthalic acid, adipic acid, sebacic acid, decanedicarboxylic acid, azelaic acid, and cyclohexanedicarboxylic acid; and diols: ethylene glycol, diethylene glycol, propylene glycol, neopentyl glyol, butanediol, pentanedial, hexanediol, 2-methyl-1,3-propane diol, bisphenol A, polyethylene glycol and polypropylene glycol, and cyclohexane dimethanol; and combinations of multiple diacids and diols. For example, as described above in one particular embodiment, the polyethylene terephthalate may be copolymerized with isophthalic acid. For instance, in one embodiment, a copolymer of polyethylene terephthalate and isophthalic acid may be used wherein the copolymer is formed from primarily ethylene glycol, terephthalic acid copolymerized with isophthalic acid; the isophthalic acid being present in the copolymer in an amount from about 0.25 mol percent to about 10 mol percent, such as from about 1 mol percent to about 7 mol percent, such as from about 2 mol percent to about 5 mol percent.

When formulating the polymer mixture, in addition to the crystallization time, the viscosity of the mixture can also be an important factor in determining in part whether excellent surface gloss can be obtained in processing by fluid-assisted injection molding. The relative amounts of the polymers can be adjusted to ensure there is sufficient melt flow.

For example, in one embodiment, the polymer mixture may be formulated so as to have a melt viscosity at 265° C. of less than about 300 Pa-s, such as less than about 250 Pa-s, such as less than about 225 Pa-s, such as even less than about 200 Pa-s. For example, in one embodiment, the melt viscosity may be from about 120 Pa-s to about 225 Pa-s at 265° C.

In addition to the above, the polymer mixture may also have a melt flow rate at 265° C. and at 2160 g load of from about 20 g/10 min to about 50 g/10 min.

Although not to be bound by any theories, it has been observed that processes made according to the present disclosure result in reducing skin formation before the flowing composition completely expands to fill the mold cavity. Delaying the onset of skin formation tends to result in reduced or eliminated surface pitting. The presence of a slower crystallizing polymer mixture allows the extremities of the mold cavity to fill prior to skin formation and then the fluid acts to pack the polymer against the cavity wall during skin formation, producing fewer pits and less glass on the surface.

In addition to the polymer mixture, the composition used to form the fluid-assisted injection molded article can contain various other ingredients and components, for example, platelet shaped filler particles, and mixtures thereof. Exemplary fibers include carbon fibers, wollastonite fibers, and particularly glass fibers. Exemplary platelet fillers are talc and mica. Glass fibers that may be used include, for instance, fibers comprised of lime-aluminum borosilicate glass. Fibers are typically employed in an amount from about 5% to about 50% by weight, such as in an amount from about 5% to about 25% by weight. Fibers that may be incorporated into the composition include continuous fibers and chopped fibers. When present, chopped fibers can generally have an initial length before compounding of from about 3 mm to about 5 mm.

Nonreinforcing fillers, otherwise referred to as particulate fillers defined by an aspect ratio of less than about 3, may be incorporated into the composition for various purposes. Suitable particulate filler include various mineral fillers such as, clay, silica, calcium silicate (wollastonite), mica, calcium carbonate, titanium dioxide, and the like. The fillers may be present in the composition in an amount from about 0.5% to about 50% by weight, such as from about 0.5% to about 15% by weight.

One or more coloring and/or opacifying pigments may also be incorporated into the composition, for instance, carbon black, dyes such as a black dye, titanium dioxide, iron oxide and other metallic pigments. Metallic pigments can include, for instance, aluminum pigments, gold pigments, copper pigments, bronze pigments, and the like. Metallic pigments provide the article with a brushed or polished metal appearance. Pigment particles are effective typically in an amount from about 0.1% to about 5% by weight.

Preferably the compositions further comprise a stabilizer. Preferred are phosphorous-containing stabilizers. In one embodiment, for instance, a phosphite stabilizer may be obtained from GE Specialty Chemicals under the trade name ULTRANOX 626. A useful phosphite stabilizer is bis(2,4-di-t-butylphenyl) pentaerythritol diphosphite. Another phosphite stabilizer that may be used in accordance with the present disclosure is sold under the name IRGAFOS 126 by BASF. Other phosphorous-containing stabilizers include phosphates or phosphonates. Phosphorous stabilizers are effectively employed in an amount from about 0.1% to about 5% by weight, such as in an amount from about 0.1% to about 1% by weight.

Another ingredient that may be contained in the composition is a lubricant. The lubricant can be used in order to facilitate mold release. One example of a lubricant that may be used includes any suitable wax, such as an amide wax, a montan wax, esters of montan wax, stearic acide, stearyl alcohol, stearamides, and the like.

The present invention results in reducing or eliminating surface pitting. For instance, articles made according to the present invention can have pits appearing on the exterior surface of the article in an amount less than 2.8% of the surface area, such as in an amount less than about 2.5% of the surface area, such as in an amount less than about 2% of the surface area, such as in an amount less than about 1.5% of the surface area, such as even in an amount less than about 1% of the surface area of the article. The above results can be obtained even when the composition used to form the article contains a significant amount of reinforcing fibers or fillers, such as even when the composition contains fibers or reinforcing fillers in an amount greater than 10% by weight. Of particular advantage, surface imperfections are minimized without adversely interfering with the mechanical properties of the molded part.

In general, any suitable fluid-assisted injection molding process may be used to produce articles in accordance with the present disclosure. Fluid-assisted injection molding processes, for instance, are disclosed in U.S. Pat. No. 5,049,056, U.S. Pat. No. 5,354,523, and U.S. Pat. No. 6,896,844 which are all incorporated herein by reference.

During a fluid-assisted injection molding process, generally the polymeric composition is introduced into a mold cavity in the form of a molten stream. One or more fluids at one or more selected locations is injected into the mold cavity and applies pressure against the molten polymeric composition. The pressure of the fluid is controlled so as to create a fluid containing cavity surrounded by the molten polymeric material. The pressurized fluid is then continuously injected into the mold cavity at a controlled rate and pressure causing the molten polymer to flow through the mold space, into all of the extremities of the mold, and be pushed against the walls of the mold cavity.

After a sufficient amount of polymeric composition has been injected into the mold cavity, fluid pressure is held against the polymeric material until the material cools. In particular, the polymeric material is positively held against the mold surfaces as it solidifies into a self-supporting article. In one embodiment, a blowing agent may be premixed with the polymeric material.

In one embodiment, the rate of introduction of the polymeric material and the rate of injection of the fluid are controlled one relative to the other whereby the pressure of the fluid injected fluctuates with the pressure of the polymeric material. During this process, however, the pressure of the fluid remains higher than the pressure of the polymeric material to ensure a uniform injection during the process.

In one embodiment, the fluid may be initially introduced at a relatively high pressure in conjunction with the polymeric material in order to create a hollow cavity within the mold. The fluid pressure can then be subsequently decreased as the cavity extends within the inner region of the flowing polymeric material.

Referring to FIG. 1, for exemplary purposes only, one embodiment of a fluid-assisted molding process is shown. As illustrated, the injection molding system includes a polymer supply 10 which introduces molten polymeric material into a mold 12 that defines a mold cavity 14. The polymer supply 10, for instance, may comprise an extruder that receives the polymer material from a hopper in the form of pellets or a powder.

As shown in FIG. 1, the system can further include at least one fluid supply. For instance, in the embodiment illustrated, the system includes a first fluid supply 16 and a second fluid supply 18.

During the formation of a molded article, the process involves the step of injecting the molten polymeric material into the mold cavity 14. A first fluid, such as a liquid or a gas, is also injected into the mold cavity 14 with the polymeric material. Initially, the fluid assists in the movement of the polymeric material into the mold cavity 14, forcing the polymeric material into the extremities of the mold. The fluid also forms a void or cavity on the interior of the article being formed. Forming a cavity within the polymeric article significantly reduces the amount of polymeric material needed to produce the article, thus reducing the material cost and the weight of the finished part.

As described above, in one embodiment, the fluid entering the mold cavity 14 from the fluid supply 16 can be a gas or a liquid. In one embodiment, for instance, a gas is used such as nitrogen, air, or an inert gas. The fluid pressure is maintained against the polymeric material until the polymeric material hardens sufficiently to form a self-supporting article. The pressure can then be reduced and the article may be removed from the mold cavity 14.

In one embodiment, a first fluid, such as a gas, can be injected into the mold cavity 14 from the first fluid supply 16. After the polymeric material has been injected into the mold cavity 14, a second fluid from the second fluid supply 18 can then be injected into the mold cavity for cooling the polymeric article. In one embodiment, for instance, the second fluid may comprise a liquid, such as water. Once the polymeric article is cooled sufficiently, the fluid can then be drained from the mold cavity and the article can be removed.

In another embodiment, the second fluid injected into the mold cavity may comprise a liquid that vaporizes as the polymeric article cools. For instance, in one embodiment, liquid carbon dioxide can be injected into the mold cavity. Once contacted with the polymeric material, the carbon dioxide evaporates into a vapor which increases the fluid pressure and further forces the polymeric material against the walls of the mold cavity.

Fluid-assisted molding processes provide numerous advantages and benefits. As described above, for instance, less polymeric material may be needed to produce the polymeric article. Depending upon the pressure of the fluid against the polymeric material, for instance, an article can be formed having relatively thin walls. For instance, the average wall thickness of the resulting article can be less than 0.5 inches, such as less than 0.25 inches, such as even less than 0.1 inches. The actual wall thickness, however, will depend upon the intended use of the article being formed.

Another advantage to fluid-assisted injection molding is that the fluid prevents the polymeric material from shrinking away from the mold cavity during cooling. In addition, the fluid facilitates flowing the polymeric material throughout the mold so that the polymeric material is evenly distributed. In addition, the fluid also can minimize cycle times by serving to cool the polymeric material once injected into the mold cavity.

The present disclosure may be better understood with reference to the following examples.

Example No. 1

Figure 7A:
FIGS. 7A and 7B are perspective views representing a handle that may be molded in accordance with the present disclosure.
Figure 7B:
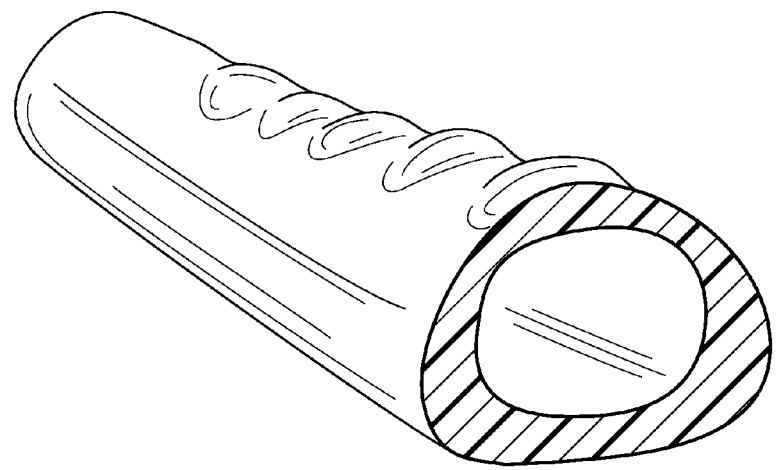

The following Example demonstrates that polymeric compositions made in accordance with the present disclosure reduce surface pitting in fluid-assisted injection molded samples. More particularly, in this Example, various different polymeric compositions were formulated and formed into molded articles using a gas-assisted injection molding process. During molding, nitrogen gas was introduced into the mold cavity. The articles formed comprised oven handles having a length of 30 inches. The oven handle that was produced is illustrated in FIGS. 7A and 7B. As shown in FIG. 7B, the oven handle included a hollow portion.

The particular compositions that were formulated and tested include the following:

TABLE 1

| % (wt) | Sample 1 | Sample 2 | Sample 3 | Sample 4 |
|---|---|---|---|---|
| PBT (IV = 0.76) masterbatch containing 16.5% carbon black | 9.05 | 9.05 | 9.05 | 9.05 |
| PBT (IV = 0.76) masterbatch, containing black dye | 2.44 | 2.44 | 2.44 | 2.44 |
| PBT (IV = 0.76-1.0) powder | 2.00 | 2.00 | 2.00 | 2.00 |
| fiberglass, 13 μm diameter, 3.175 mm | 15.00 | 15.00 | 15.00 | 15.00 |
| Lubricant | 0.25 | 0.25 | 0.25 | 0.25 |
| Talc | 0.15 | 0.15 | 0.15 | 0.15 |
| Phosphite | 0.50 | 0.50 | 0.50 | 0.50 |
| PET homopolymer | 42.11 | 38.81 | 28.21 | 14.61 |
| PET (IV = 0.59-0.83) TA + 2-4 mol % IA copolymer | 28.50 | 31.80 | 42.40 | 56.00 |
| Ratio of PET homopolymer to PET copolymer | 59.6:40.3 | 55:45 | 40:60 | 20.7:79.3 |
| % total polyester polymers included in the composition | 84.1 | 84.1 | 84.1 | 84.1 |

As shown above, each of the formulations tested contained polybutylene terephthalate. The polybutylene terephthalate was primarily used as a carrier for the carbon black and black dye so that the resulting part exhibited a black color. The polybutylene terephthalate, however, may have been replaced with the polyethylene terephthalate homopolymer and the polyethylene terephthalate copolymer in the same proportionate amounts.

Figure 6:
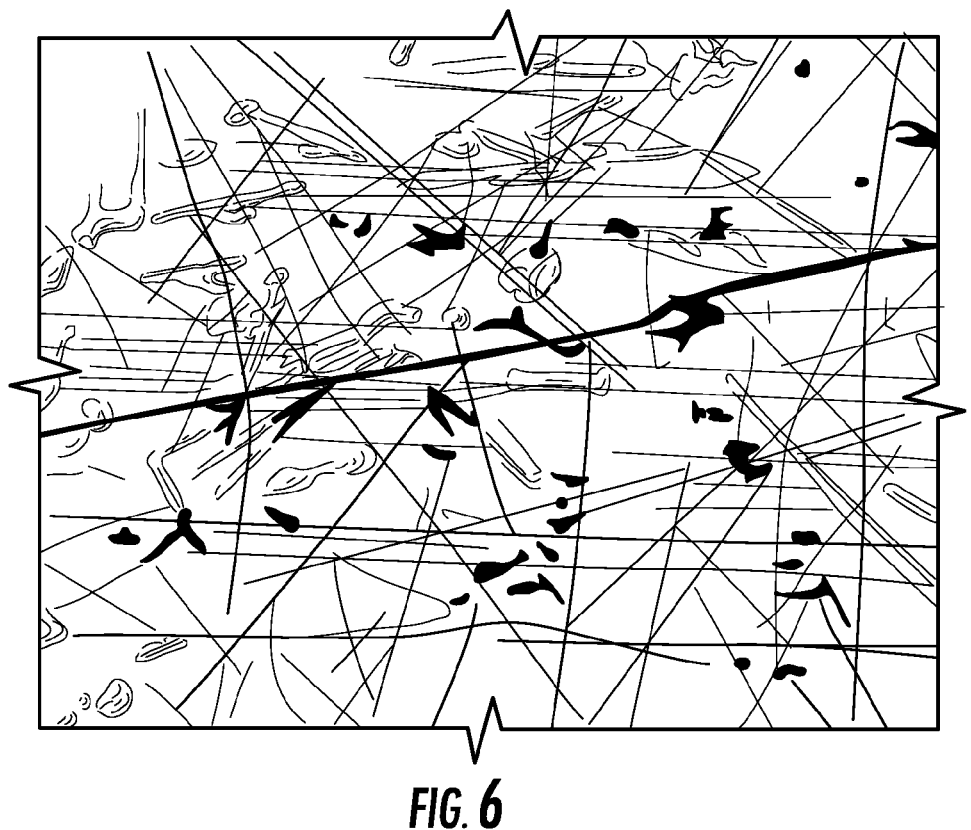
FIG. 6 is a micrograph illustrating the surface of a comparative sample as described in the Examples below.

Micrograph images of each sample were taken using reflected light optical microscopy. The results are illustrated in FIG. 2 through FIG. 5. For purposes of comparison, a commercially available composition was also used to form an oven handle. A micrograph image of the comparative sample is illustrated in FIG. 6. The commercially available formulation contained polyethylene terephthalate combined with 15% by weight fiberglass. As shown, in comparison to the image of FIG. 6, the molded articles made in accordance with the present disclosure have dramatically and unexpectedly improved surface characteristics. In particular, a significant reduction in surface pitting at the surface is shown.

The micrograph images were also analyzed quantitatively for surface pitting. In particular, the images were taken from about 3 cm areas from the middle of each handle. The micrographs were imaged using Image Pro software. The pits were identified using color sensitivity, with the dark areas representing surface pits. The total area counts for all the pits in the micrograph was divided by the total area count of the entire micrograph to determine the percent relative area of pitting. The results of 8 micrographs were averaged. The following results were obtained.

TABLE 2

| Sample | Average % Relative Area of Pits |
|---|---|
| Sample 1 | 0.59 |
| Sample 2 | 1.66 |
| Sample 3 | 1.32 |
| Sample 4 | 0.30 |
| Comparative Sample | 2.98 |

Additionally, the following tests were performed on the samples made according to the present disclosure:
Tensile Strength and Strain
The tensile strength and strain properties of the sample were tested according to ISO Test No. 527. Calculations of tensile strength at break, percent elongation at break, and tensile modulus were performed.

Flexural Strength and Strain

The flexural strength of a sample is defined as its ability to resist deformation under load. More particularly, the flexural test was conducted according to ISO Test No. 178 and measures the force required to bend the specimen under three point loading conditions. The flexural strength as well as the flexural modulus were recorded.

Notched Charpy

The impact resistances of a sample were tested according to ISO Test No. 179. The test was performed at 23° C. and measures energy absorbed by the sample material during fracture.

Deflection Under Load

The deflection under load (DTUL) was measured at 1.8 MPa according to ISO Test No. 75.

The results of the mechanical properties tests are provided in the following table.

TABLE 3

|   | Sample 1 | Sample 2 | Sample 3 | Sample 4 |
|---|---|---|---|---|
| Tensile Strength @ Break (MPa) | 89.71 | 88.04 | 88.76 | 94.04 |
| Elongation at Break (%) | 1.64 | 1.56 | 1.57 | 1.71 |
| Tensile Modulus (Mpa) | 6492 | 6593 | 6735 | 6546 |
| Flex Strength (MPa) | 132.57 | 133.04 | 135.21 | 134.12 |
| Flex Mod (MPa) | 6080 | 6234 | 6207 | 6117 |
| Notched Charpy (kJ/m$^2$) | 4.08 | 3.99 | 4.26 | 4.21 |
| DTUL @ 1.8 MPa | 160.7 | 160.6 | 165.2 | 157.3 |

Tests were also conducted to measure the melt flow rate at 265° C. of the polymeric compositions. The melt flow rate test was performed using a capillary rheometer with an orifice of 1.0160 mm diameter and 15.240 mm length. Melt flow rate was determined according to ISO Test No. 1133. In addition to melt flow rate, the isothermal crystallization time at 220° C. was also measured.

During molding of the hollow handles using the gas-assist process, the cycle time was also recorded. The cycle time is defined as the time interval from injecting the polymer composition into the mold, molding the part, removing the part from the mold, and until the beginning of the next injection. As used herein, cycle time is determined when molding a hollow part having an Lid of about 22. During gas-assist injection molding, the barrel temperature is maintained between 250° C. and 280° C. The shot size of the polymeric composition is from 540 ccm to 560 ccm and the compression ratio is 3.5:1.

The following results were obtained:

TABLE 4

|   | Sample 1 | Sample 2 | Sample 3 | Sample 4 |
|---|---|---|---|---|
| Melt flow rate at 265° C. and at 2160 g load (g/10 mins.) | 31.05 | 30.94 | 32.60 | 29.19 |
| Isothermal crystallization time @ 220° C. (min) | 0.74 | 0.80 | 0.96 | 1.23 |
| Cycle Time (sec) | 82 | 87 | 92 | 98 |

Example No. 2

The following Example demonstrates that polymeric compositions made in accordance with the present disclosure containing a polyethylene terephthalate homopolymer in combination with a polyethylene terephthalate copolymer offer various advantages and benefits over compositions containing a polyethylene terephthalate homopolymer combined with polybutylene terephthalate.

In this example, the following compositions were formulated and tested.

TABLE 5

| % (wt) | Sample 5 | Comparative Sample 1 | Comparative Sample 2 | Comparative Sample 3 |
|---|---|---|---|---|
| PBT (IV = 0.76) masterbatch containing 16.5% carbon black |  |  | 9.05 | 9.05 |
| PBT (IV = 0.76) masterbatch, containing black dye | 2.44 | 2.44 | 2.44 | 2.44 |
| PBT (IV = 0.76-1.0) powder | 2.50 | 2.50 | 2.00 | 2.00 |
| fiberglass, 13 μm diameter, 3.175 mm | 15.00 | 15.00 | 15.00 | 15.00 |
| Lubricant | 0.25 | 0.25 | 0.25 | 0.25 |
| Talc | 0.15 | 0.15 | 0.50 |  |
| Phosphite | 0.50 | 0.50 | 0.50 | 0.50 |
| 1st UV additive | 0.25 | 0.25 |  |  |
| 2$^{nd}$ UV additive | 0.25 | 0.25 |  |  |
| Zinc sulfide | 9.25 | 9.25 |  |  |
| PET homopolymer | 41.76 | 69.41 | 66.30 | 66.30 |
| PBT |  |  | 3.96 | 4.46 |
| PET (IV = 0.59-0.83) TA + 2-4 mol % IA copolymer | 27.65 |  |  |  |
| Ratio of PET homopolymer to PET copolymer | 60.2:39.8 |  |  |  |
| % total polyester polymers included in the composition | 74.35 | 74.35 | 83.75 | 84.25 |

The results of the mechanical properties tests are provided in the following table for Comparative Sample Nos. 2 and 3.

TABLE 6

|   | Comparative Sample 2 | Comparative Sample 3 |
|---|---|---|
| Tensile Strength @ Break (MPa) | 70.68 | 86.82 |
| Elongation at Break (%) | 1.56 | 1.54 |
| Tensile Modulus (MPa) | 6799 | 6564 |
| Flex Strength (MPa) | 117.07 | 116.36 |
| Flex Mod (MPa) | 6278 | 6122 |
| Notched Charpy (kJ/m$^2$) | 4.03 | 3.94 |
| DTUL @ 1.8 MPa | 165 | 165 |

The above compositions were molded into the oven handles shown in FIGS. 7A and 7B according to the same process described in Example No. 1. During molding of the hollow handles using the gas-assist process, the cycle time was also recorded.

The following results were obtained:

TABLE 7

|   | Sample 5 | Comparative Sample 1 | Comparative Sample 2 | Comparative Sample 3 |
|---|---|---|---|---|
| Melt flow rate at 265° C. and at 2160 g load (g/10 mins.) | 23.03 | 23.22 |  |  |
| Isothermal crystallization time @ 220° C. (min) | 0.48 | 0.31 |  |  |
| Cycle Time (sec) | 75 | 80 | 102.4 | 102.7 |

As shown above, the composition made according to the present disclosure had a significantly reduced cycle time in comparison to the other samples. In particular, compositions made according to the present disclosure can have a cycle time of less than 100 seconds, such as less than 90 seconds, such as less than 80 seconds. The cycle time is generally greater than 50 seconds, such as greater than 60 seconds.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A molded product comprising:
   an injection molded article defining an exterior surface having a surface area and an internal fluid-formed hollow cavity, the article being made from a composition containing a polymer mixture and reinforcing fibers or reinforcing fillers, the polymer mixture comprising from about 45% to about 95% by weight of the composition, the polymer mixture comprising a polyethylene terephthalate homopolymer combined with a polyethylene terephthalate copolymer, the polyethylene terephthalate homopolymer and the polyethylene terephthalate copolymer being present in the polymer mixture in a weight ratio of from about 10:90 to about 70:30, the polymer mixture optionally containing another polyester polymer in an amount from 0% to about 25% by weight, the other polyester comprising a polybutylene terephthalate, a polybutylene naphthalate, a polytrimethylene terephthalate, a polypropylene terephthalate or a polycyclohexylene dimethyl terephthalate, the polymer mixture having a melt flow rate at 265° C. and at a 2160 g load of from about 20 g/10 min to about 50 g/10 min, the exterior surface of the article containing pits in an amount less than about 2.5% of the surface area of the exterior surface.

2. A molded product as defined in claim 1, wherein the polymer mixture only comprises the polyethylene terephthalate homopolymer and the polyethylene terephthalate copolymer.

3. A molded product as defined in claim 1, wherein the polyethylene terephthalate copolymer comprises a copolymer of polyethylene terephthalate with isophthalic acid, the isophthalic acid being present in the copolymer in an amount from about 0.5 mol % to about 10 mol % of the diacids.

4. A molded product as defined in claim 1, wherein the injection molded article further comprises a particulate filler.

5. A molded product as defined in claim 1, wherein the article contains reinforcing fibers comprising glass fibers, the fibers being present in the injection molded article in an amount from about 5% to about 50% by weight.

6. A molded product as defined in claim 1, wherein the polymer mixture contains polybutylene terephthalate in an amount from about 2% to about 15% by weight, the composition further comprising a pigment, the polybutylene terephthalate comprising a carrier for the pigment.

7. A molded product as defined in claim 1, wherein the polyethylene terephthalate copolymer comprises a copolymer of polyethylene terephthalate with isophthalic acid, the isophthalic acid being present in the copolymer in an amount from about 0.5 mol percent to about 10 mol percent, the article containing reinforcing fibers comprising glass fibers in an amount from about 5% to about 25% by weight.

8. A molded product as defined in claim 1, wherein the exterior surface of the article contains pits in an amount less than about 1.7% of the surface area of the exterior surface.

9. A molded product as defined in claim 1, wherein the injection molded article has a cylindrical-like shape.

10. A molded product as defined in claim 1, wherein the polymer mixture has an isothermal crystallization time at 220° C. of from about 0.7 mins to about 3 mins.

11. A molded product as defined in claim 1, wherein the composition used to form the injection molded article contains a stabilizer comprising a phosphite and a lubricant.

12. A molded product as defined in claim 1, wherein the injection molded article has an average wall thickness of less than about 0.25 inches.

13. A molded product as defined in claim 1, wherein the article contains reinforcing fibers comprising glass fibers, the fibers being present in the injection molded article in an amount from about 5% to about 25% by weight, the composition further containing a phosphite stabilizer, a lubricant, and talc particles, each of the lubricant, the talc particles, and the phosphite stabilizer being present in the composition in an amount less than about 2% by weight, the polyethylene terephthalate copolymer comprising a copolymer of polyethylene terephthalate with isophthalic acid, the isophthalic acid being present in the copolymer in an amount from about 0.5 mol percent to about 5 mol percent of the diacids.

14. A molded product comprising:
   an injection molded article defining an exterior surface having a surface area and an internal fluid-formed hollow cavity, the article being made from a composition containing a polymer mixture and reinforcing fibers or reinforcing fillers, the polymer mixture comprising from greater than about 60% to less than about 90% by weight of the composition, the polymer mixture comprising a polyethylene terephthalate homopolymer combined with a polyethylene terephthalate copolymer, the polyethylene terephthalate homopolymer and the polyethylene terephthalate copolymer being present in the polymer mixture in a weight ratio of from about 15:85 to about 65:35, the polymer mixture containing another polyester polymer in an amount from about 2% to about 15% by weight, the another polyester comprising a polybutylene terephthalate, a polybutylene naphthalate, a polytrimethylene terephthalate, or a polypropylene terephthalate, the polymer mixture having a melt flow rate at 265° C. and at a 2160 g load of from about 20 g/10 min to about 50 g/10 min, the reinforcing fibers or reinforcing fillers comprising from about 5% to about 25% by weight of the composition, the reinforcing fibers or reinforcing fillers comprising glass fibers, the exterior surface of the article containing pits in an amount less than about 2.5% of the surface area of the exterior surface.

* * * * *